(12) United States Patent
Bekkerman

(10) Patent No.: US 12,277,505 B2
(45) Date of Patent: Apr. 15, 2025

(54) NEIGHBORHOOD-BASED ENTITY RESOLUTION SYSTEM AND METHOD

(71) Applicant: Cherre, Inc., New York, NY (US)

(72) Inventor: Ron Bekkerman, Tenafly, NJ (US)

(73) Assignee: Cherre, Inc., New York, NY (US)

( * ) Notice: Subject to any disclaimer, the term of this patent is extended or adjusted under 35 U.S.C. 154(b) by 1092 days.

(21) Appl. No.: 16/993,252

(22) Filed: Aug. 13, 2020

(65) Prior Publication Data

US 2022/0051110 A1 Feb. 17, 2022

(51) Int. Cl.
*G06N 5/02* (2023.01)
*G06F 18/20* (2023.01)
*G06V 10/75* (2022.01)
*G06F 18/25* (2023.01)
*G06Q 50/16* (2012.01)

(52) U.S. Cl.
CPC .............. *G06N 5/02* (2013.01); *G06F 18/29* (2023.01); *G06V 10/751* (2022.01); *G06F 18/25* (2023.01); *G06Q 50/16* (2013.01)

(58) Field of Classification Search
None
See application file for complete search history.

(56) References Cited

U.S. PATENT DOCUMENTS

| | | |
|---|---|---|
| 11,030,534 B2 | 6/2021 | Fothergill et al. |
| 2013/0346421 A1 | 12/2013 | Wang et al. |
| 2014/0074764 A1 | 3/2014 | Duftler et al. |
| 2014/0280307 A1 | 9/2014 | Gupta et al. |
| 2015/0356202 A1 | 12/2015 | Yampolska et al. |
| 2018/0189634 A1 | 7/2018 | Abelaziz et al. |
| 2018/0357238 A1 | 12/2018 | Cowan et al. |
| 2019/0042988 A1 | 2/2019 | Brown et al. |
| 2019/0188324 A1 | 6/2019 | Zhao et al. |
| 2019/0278777 A1 | 9/2019 | Hassan et al. |
| 2019/0354883 A1 | 11/2019 | Aravamudan et al. |
| 2020/0081917 A1 | 3/2020 | Irmer et al. |
| 2020/0134032 A1 | 4/2020 | Lin et al. |
| 2020/0167376 A1 | 5/2020 | Aravamudan et al. |
| 2020/0257730 A1 | 8/2020 | Srinivas et al. |

(Continued)

FOREIGN PATENT DOCUMENTS

TW 201807602 3/2018

OTHER PUBLICATIONS

International Search Report dated Nov. 15, 2021 for PCTUS-2021045783.

(Continued)

*Primary Examiner* — Alan Chen
(74) *Attorney, Agent, or Firm* — Dovas Law, P.C.

(57) ABSTRACT

A method for resolving entities in a knowledge graph including determining node sets in the knowledge graph, determining each of the node sets includes determining a first node, determining a second node in a semantic neighborhood of the first node, and determining a third node in the semantic neighborhood of the first node. For each node set, the second node and the third node are compared, and it is determined that the second node and the third node are a similar node pair. For each similar node pair, the first nodes of the node sets are aggregated, and a quantity of overlapping of a semantic neighborhood of the second node and a semantic neighborhood of the third node is determined, and for each similar node pair, the second and third nodes are resolved as a single entity.

34 Claims, 11 Drawing Sheets

(56) References Cited

U.S. PATENT DOCUMENTS

| | | |
|---|---|---|
| 2022/0051110 A1 | 2/2022 | Bekkerman et al. |
| 2022/0101151 A1 | 3/2022 | Portisch et al. |
| 2022/0292262 A1 | 9/2022 | Japa et al. |

OTHER PUBLICATIONS

International Preliminary Report On Patentability dated Mar. 4, 2022 for PCTUS21045783.

International Preliminary Report On Patentability dated Dec. 7, 2022 for PCTUS2152062.

International Search Report dated Jan. 12, 2022 for PCTUS2152062.

L. Hermanssonm et al., Entity Disambiguation in Anonymized Graphs Using Graph Kernels, https://doi.org/10.1145/2505515.2505565, pp. 1037-1046, Oct. 2013.

Huang et al.,"Leveraging Deep Neural Networks and Knowledge Graphs for Entity Disambiguation", arXiv:1504.07678v1 [cs.CL], Apr. 28, 2015, 10 pages. (Year: 2015).

Article 34 amendment dated Mar. 4, 2022 for PCT/US2021/45783.

Extended European Search Report dated Aug. 2, 2024 for EP Application No. 21856736.0.

European Patent Application Publication No. EP4196925, published Jun. 21, 2023 for EP Application No. 21856736.0, including international application published by WIPO under WO 2022/036125.

Claim amendment dated Oct. 4, 2023 for EP Application No. 21856736.0, which amended claims are referenced in the Extended European Search Report dated Aug. 2, 2024 for EP Application No. 21856736.0.

Extended European Search Report dated Sep. 10, 2024 for EP Application No. 21878226.6 (based on claims in the Art. 34 Amendment for PCT/US2021/052062 set forth in the International Preliminary Report on Patentability for PCT/US2021/052062 dated Dec. 7, 2022 included in the Information Disclosure Statement dated Dec. 20, 2022).

European Patent Application Publication No. EP4226293, published Aug. 16, 2023 for EP Application No. 21878226.6, including international application PCT/US2021/052062 published by WIPO under WO 2022/076182.

Shin, D., Kim, T., Choi, J., Kim J., Author name disambiguation using a graph model with node splitting and merging based on bibliographic information, Scientometrics, vol. 100, 15-50 (Apr. 19, 2014), https://doi.org/10.1007/s11192-014-1289-4 (retrieved by European Patent Office Jul. 26, 2024 for EP21878226, cited in Extended European Search Report dated Sep. 10, 2024 for EP21878226).

John Hopcroft and Robert Tarjan, Efficient Algorithms for Graph Manipulation, Cornell University, Ithaca, NY, Mar. 24, 1971.

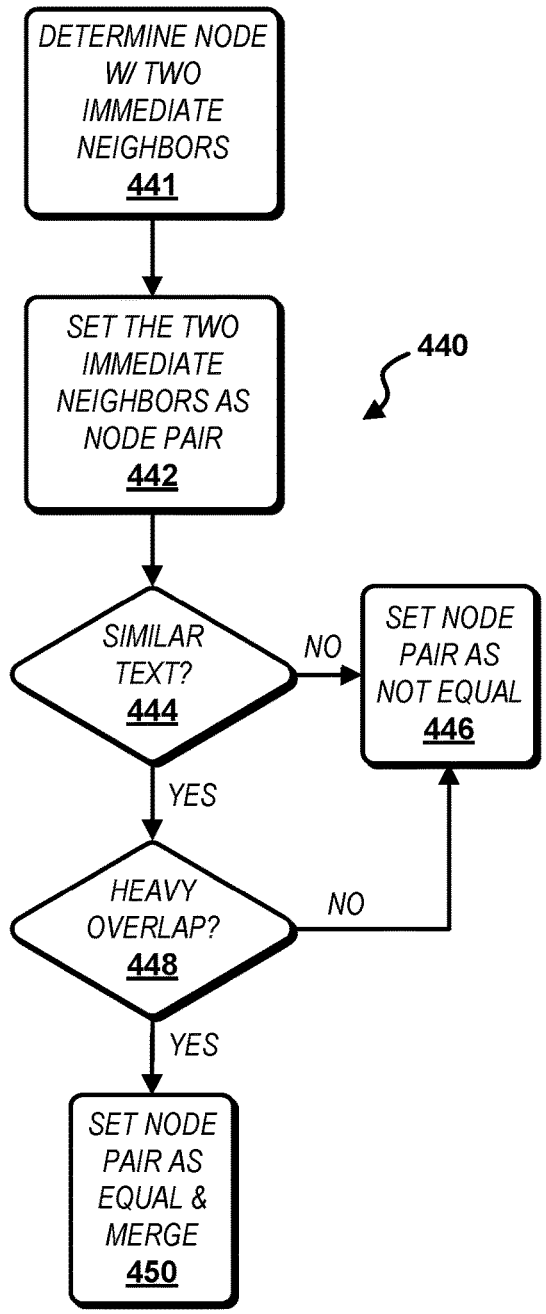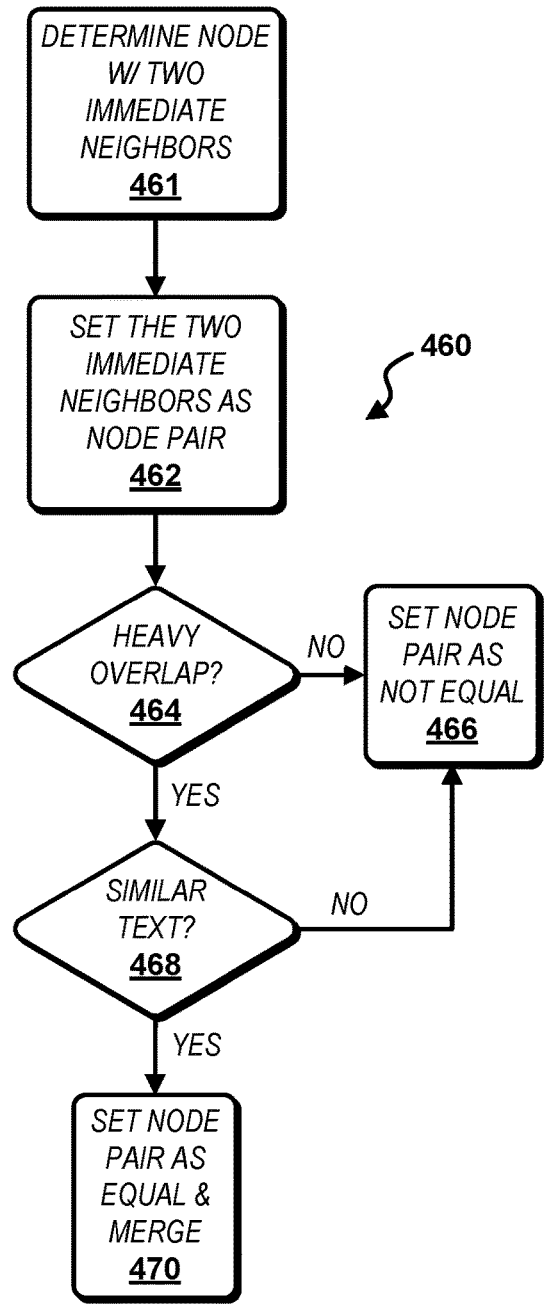
FIG. 7A
FIG. 7B

NEIGHBORHOOD-BASED ENTITY RESOLUTION SYSTEM AND METHOD

FIELD OF INVENTION

The invention relates generally to processor-enabled entity resolution, and more particularly to processor-enabled neighborhood-based entity resolution.

BACKGROUND

Computer systems need to be able to identify, store, and recall indications of real-world entities. Computer systems in communication with each other may further need to resolve identities of entities, that is to agree whether two identities are the same or not, in order to exchange information about a given entity and retain information about the entity, without having complete information. When multiple computer systems in a computer network are required to exchange data relating to a particular entity to facilitate a transaction, resolving identities becomes more challenging. The resolving of identities of entities is frequently time sensitive, and delays in resolving an entity may affect the ability of a transaction to be completed.

Many industries rely on publicly sourced network-accessible data, the quality and accuracy of which is not always easily ascertained. Resolving entities based on such data can be computationally intensive based on the volume and quality of the data. The real estate industry in particular is faced with data from various disparate municipalities which is maintained at different levels of government, including for example borough, city, county, and state governments.

A knowledge graph enables organizing and analyzing knowledge in a computing environment. In a knowledge graph, entities are represented as nodes and their relationships are represented as edges connecting nodes. Attributes can be associated with both nodes and edges.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for resolving entities in a knowledge graph is provided. The method includes determining a plurality of node sets in the knowledge graph, determining each of the plurality of node sets including determining a first node, determining a second node in a semantic neighborhood of the first node, and determining a third node in the semantic neighborhood of the first node. For each of the plurality of node sets, the second node and the third node are compared, and it is determined that the second node and the third node are a similar node pair based on the comparing the second node and the third node. For each similar node pair, the first nodes of the plurality of node sets are aggregated into an overlap of a semantic neighborhood of the second node and a semantic neighborhood of the third node, and a quantity of overlapping of the semantic neighborhood of the second node and the semantic neighborhood of the third node is determined based on the aggregating the first nodes of the plurality of node sets. Further, for each similar node pair, the second node and the third node are resolved as a single entity at least based on the determining the quantity of overlapping of the semantic neighborhood of the second node and the semantic neighborhood of the third node and the determining that the second node and the third node are the similar node pair.

Further provided is a computing system including one or more hardware processors and one or more non-transitory computer-readable storage media coupled to the one or more hardware processors and storing programming instructions for execution by the one or more hardware processors, wherein the programming instructions, when executed, cause the computing system to perform operations. The operations include determining a first node set in a knowledge graph, the determining the first node set including determining a first node, determining a second node in a semantic neighborhood of the first node, and determining a third node in the semantic neighborhood of the first node. The operations further include determining a second node set in the knowledge graph, the determining the second node set including determining a fourth node, determining the second node in a semantic neighborhood of the fourth node, and determining the third node in the semantic neighborhood of the fourth node. The operations further include comparing the second node and the third node, and determining that the second node and the third node are similar based on the comparing the second node and the third node. The operations further include aggregating at least the first node set and the second node set, and determining a quantity of overlapping of a semantic neighborhood of the second node and a semantic neighborhood of the third node based on the aggregating the at least the first node set and the second node set. The operations further include resolving the second node and the third node as a single entity at least based on the determining the quantity of overlapping of the semantic neighborhood of the second node and the semantic neighborhood of the third node and the determining that the second node and the third node are similar.

Another method for resolving entities in a knowledge graph is provided including determining a first node set in the knowledge graph, the determining the first node set including determining a first node, determining a second node in a semantic neighborhood of the first node, and determining a third node in the semantic neighborhood of the first node. The method further includes determining a second node set in the knowledge graph, the determining the second node set including determining a fourth node, determining the second node in a semantic neighborhood of the fourth node, and determining the third node in the semantic neighborhood of the fourth node. The second node and the third node are compared, and it is determined that the second node and the third node are similar based on the comparing the second node and the third node. At least the first node set and the second node set are aggregated, and a quantity of overlapping of a semantic neighborhood of the second node and a semantic neighborhood of the third node is determined based on the aggregating the at least the first node set and the second node set. The second node and the third node are resolved as a single entity at least based on the determining the quantity of overlapping of the semantic neighborhood of the second node and the semantic neighborhood of the third node and the determining that the second node and the third node are similar.

Another method for resolving entities in a knowledge graph is provided comprising determining a first node, determining a second node in a semantic neighborhood of the first node, and determining a third node in the semantic neighborhood of the first node. The second node and the third node are compared, and it is determining that the second node and the third node are similar based on the comparing the second node and the third node. The first node and a plurality of other nodes in the knowledge graph are aggregated into an overlap of a semantic neighborhood of the second node and a semantic neighborhood of the third node, and a quantity of overlapping of the semantic neighborhood of the second node and the semantic neighborhood of the third node is determined based on the aggregating the first node and the plurality of other nodes. The second node and the third node are resolved as a single entity at least based on the determining the quantity of overlapping of the semantic neighborhood of the second node and the semantic neighborhood of the third node and the determining that the second node and the third node are similar.

Another method for resolving entities in a knowledge graph is provided comprising determining a first node, determining a second node in a semantic neighborhood of the first node, and determining a third node in the semantic neighborhood of the first node. The second node and the third node are compared, and it is determined that the second node and the third node are similar based on the comparing the second node and the third node. A quantity of nodes in the semantic neighborhood of the first node are determined, and the second node and the third node are resolved as a single entity at least based on the determining the quantity of nodes in the semantic neighborhood of the first node and the determining that the second node and the third node are similar.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 is a diagram showing a system including an identity manager for resolving entity identity according to an illustrative embodiment.

FIGS. 2, 3, 4A, and 4B figuratively show exemplary knowledge graphs for visualizing methods according to illustrative embodiments.

FIGS. 5, 6, 7A and 7B are diagrams showing methods for resolving entities in knowledge graphs according to illustrative embodiments.

DETAILED DESCRIPTION OF ILLUSTRATIVE EMBODIMENT(S)

Figure 1:
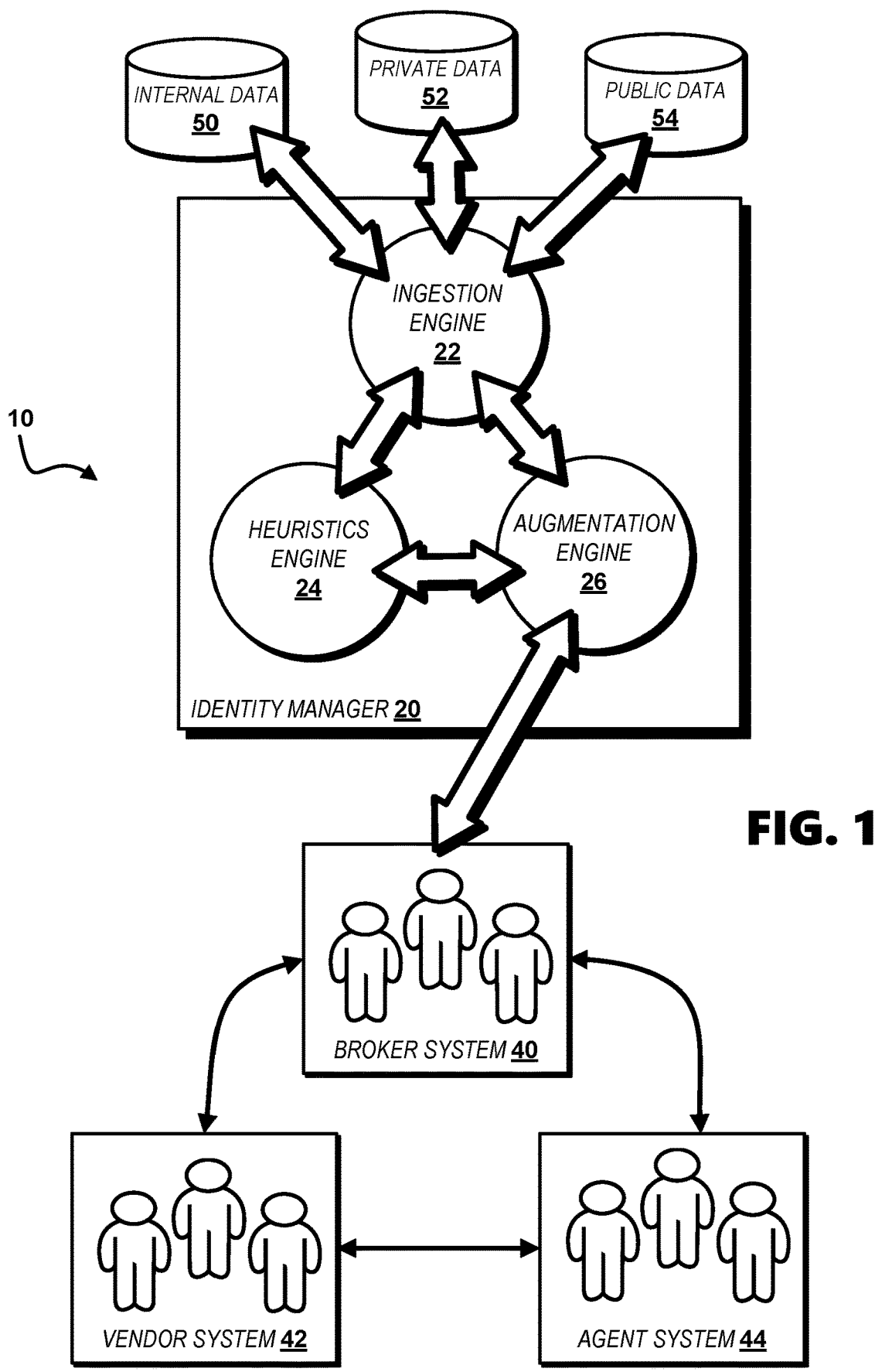

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Referring to FIG. 1, a system 10 for resolving entity identity is provided in a communications network including one or more wired or wireless networks or a combination thereof, for example including a local area network (LAN), a wide area network (WAN), the Internet, mobile telephone networks, and wireless data networks such as Wi-Fi™ and 3G/4G/5G cellular networks. The system 10 includes a network-accessible processor-enabled identity manager 20 used in accessing data stores of varied identifying information, including for example data stores 50, 52, 54. The identity manager 20 is accessible by client computer systems 40, 42, 44. While the operation of the identity manager 20 is described herein with respect to network-connectable client computer systems 40, 42, 44 and data stores 50, 52, 54, one skilled in the art will recognize that the identity manager 20 can operate with other suitable wired or wireless network-connectable computing systems. The identity manager 20 includes an ingestion engine 22, a heuristics engine 24, and an augmentation engine 26. The identity manager 20 can be implemented on one or more network-connectable processor-enabled computing systems, for example in a peer-to-peer configuration, and need not be implemented on a single system at a single location. The identity manager 20 is configured for communication via a communications network with the network-connectable client computing systems 40, 42, 44 which are identified for exemplary purposes as a broker system 40, a vendor system 42, and an agent system 44. The identity manager 20 has further access to an internal data store 50, a private data store 52, and a public data store 54, which are beneficially accessible via network communication.

The identity manager 20 enables the acquiring, collecting, and analyzing of network-located data in real-time. The identity manager 20 can be implemented for example to collect and analyze non-public and public real estate data, which data can be rendered accessible to real estate brokers, vendors, and agents respectively via the broker system 40, the vendor system 42, and the agent system 44.

Figure 2:
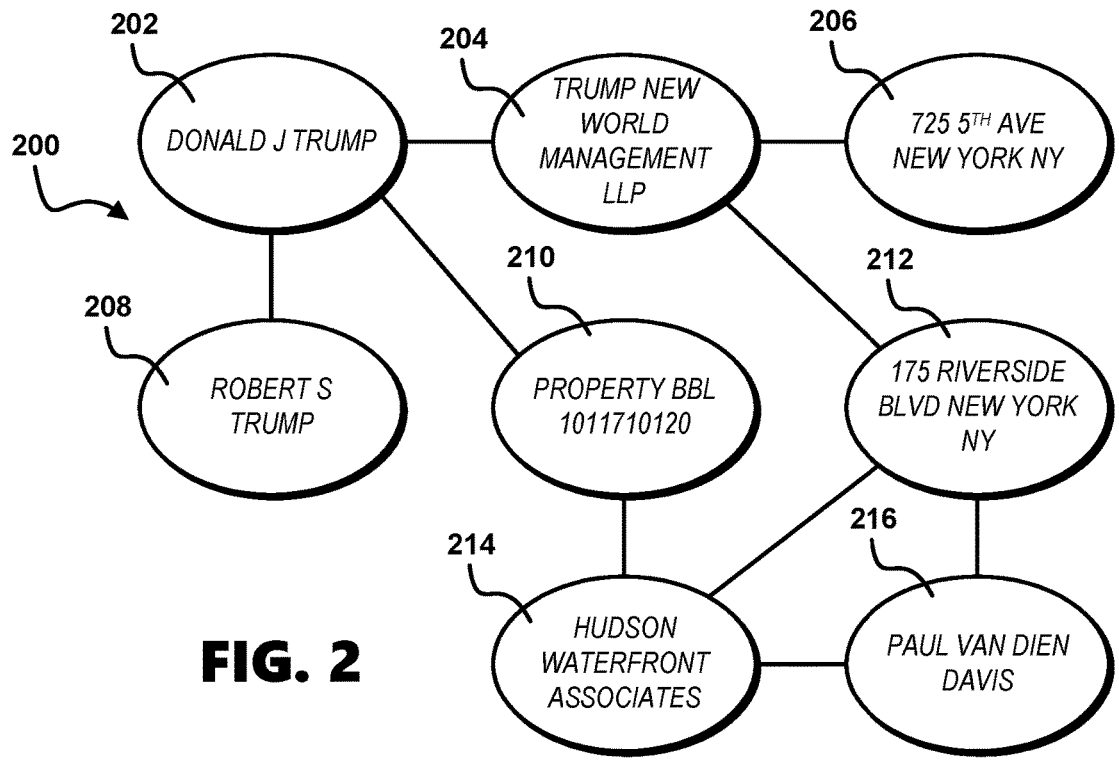

The identity manager 20 via the ingestion engine 22, heuristics engine 24, and augmentation engine 26 enables knowledge graphs in which entities are real estate properties, addresses, people, and companies that operate in the real estate domain. Alternatively, the identity manager 20 can enable knowledge graphs including other types of entities. A knowledge graph is particularly useful for revealing hidden relationships between entities by traversing the graph from one node to another over the edges. Referring to FIG. 2, a first exemplary knowledge graph 200 reveals a relationship between "Donald J Trump" and "Paul Van Dien Davis." The relationship is revealed by starting at a Donald J Trump node 202, following an edge to a Property BBL (i.e., Borough, Block and Lot) 1011710120 node 210, following an edge to a Hudson Waterfront Associates node 214, and then following an edge to a Paul Van Dien Davis node 216. Also included in the first exemplary knowledge graph 200 are a Trump New World Management LLP node 204, a 725 5$^{th}$ Ave New York NY node 206, a Robert S Trump node 208, and a 175 Riverside Blvd New York NY node 212. Revealing hidden relationships may be very valuable in practical applications.

The challenge of knowledge graphs is their large scale (e.g., billions of nodes and edges). Neither the structure nor the content of even a modestly large knowledge graph can be humanly analyzed which creates a battery of problems.

For example, it is difficult to assess the quality of the knowledge graph. And since a typical knowledge graph is constructed from many raw datasets, the quality of the knowledge graph cannot be taken for granted.

Figure 3:
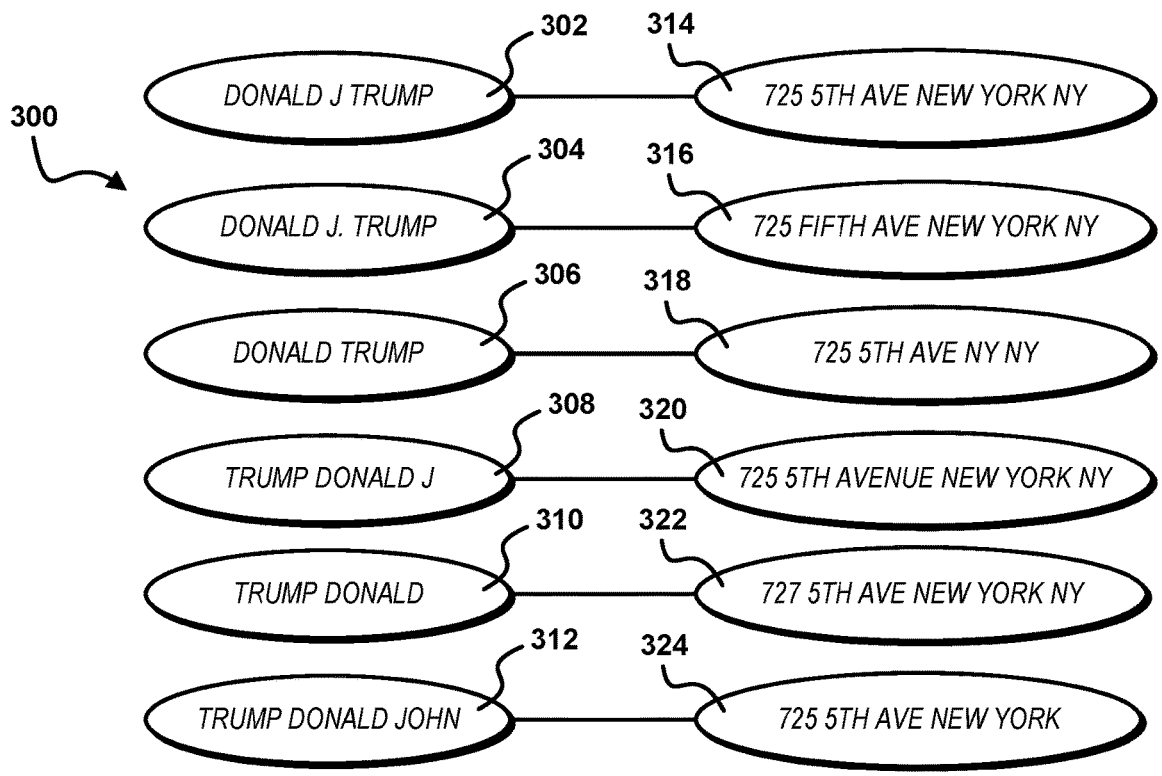

Referring to FIG. 3, a second exemplary knowledge graph 300 of particularly low quality is shown. The second exemplary knowledge graph 300 includes small, disconnected subgraphs which do not allow any traversing, therefore making the graph largely useless as presented. However, it can be inferred that name nodes 302, 304, 306, 308, 310, 312 on the left correspond to the same entity represented in a slightly different format. It can also be inferred that address nodes 314, 316, 318, 320, 322, 324 on the right correspond to the same entity represented in a slightly different format. Beneficially the name nodes 302, 304, 306, 308, 310, 312 on the left can be merged into a single node, and the address nodes 314, 316, 318, 320, 322, 324 on the right can be merged into a single node as well. This merging procedure would improve the quality of the second exemplary knowledge graph 300, because duplications of the same entity would be eliminated, and because the graph structure would become traversable.

A typical knowledge graph is not as simple as in the second exemplary knowledge graph 300. A typical knowledge graph is substantially larger and is not easily breakable into disconnected components. Therefore, it is difficult to determine a typical knowledge graph is not traversable and to decide that the graph is not useful.

Figure 4A:
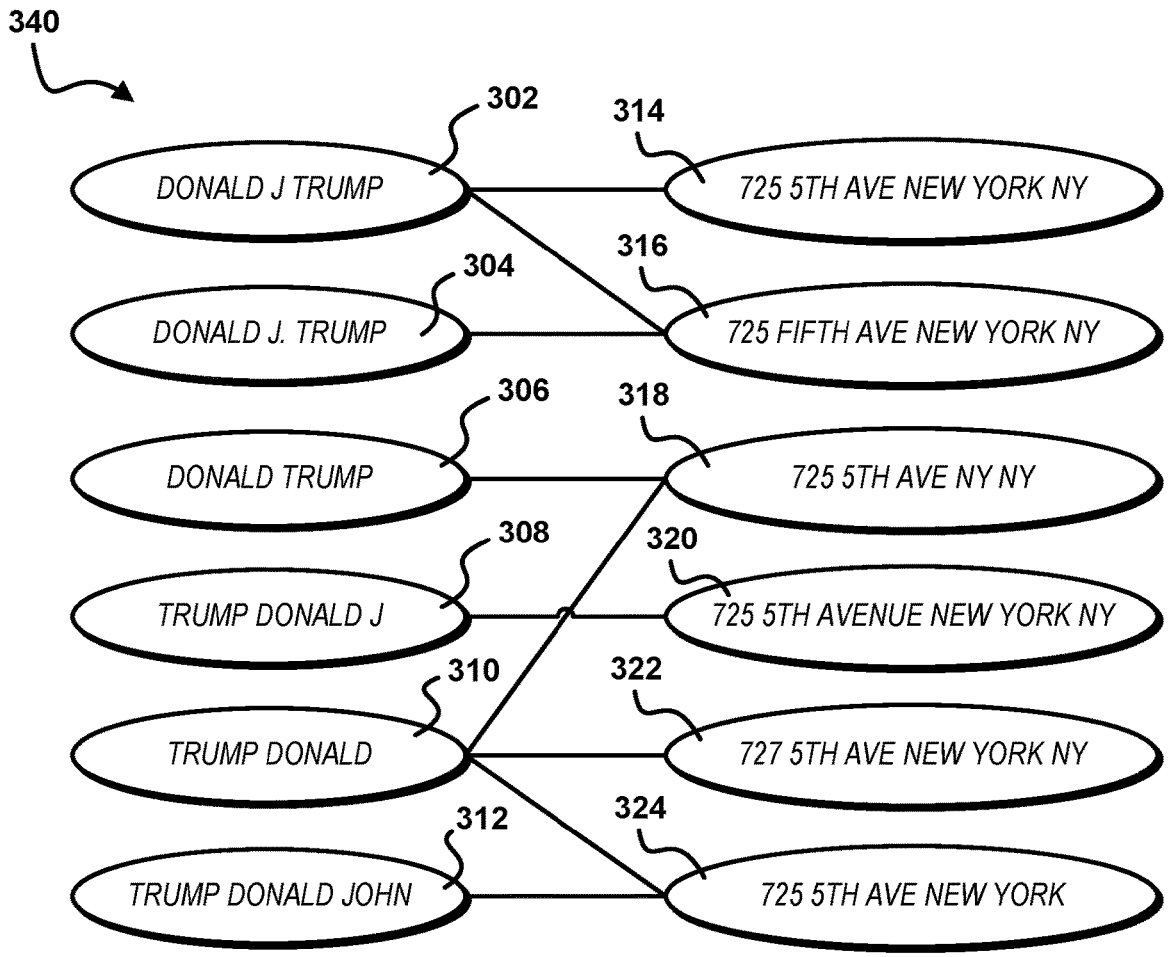

Referring to FIG. 4A, a third exemplary knowledge graph 340 is shown. In the third exemplary knowledge graph 340 it is not trivial to programmatically figure out that the quality of the knowledge graph is low. Heuristics can be used to merge together nodes corresponding to the same entity. For instance, the Donald J Trump node 302 and the Donald J. Trump node 304 differ only in a period ("."). A regular expression can be created to delete the period ("."), and then the two names would become the same.

Figure 4B:
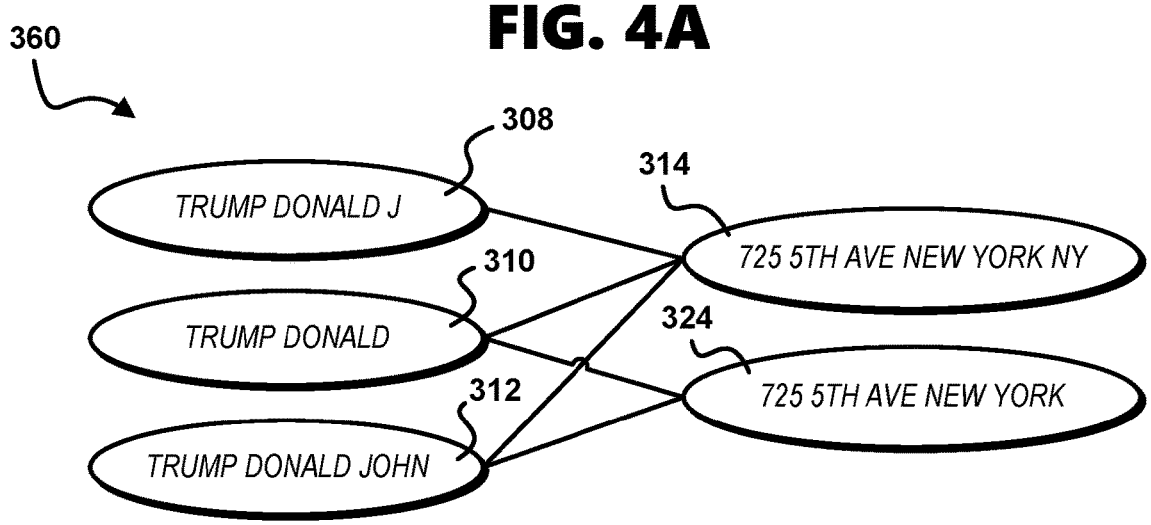

Referring to FIG. 4B, a fourth exemplary knowledge graph 360 is generated by applying heuristics to and compressing the third exemplary knowledge graph 340 by merging the nodes. Additional merging is not trivial because entities on the left corresponding to name nodes 308, 310, 312 differ substantially. For instance, a person named Trump, Donald J and corresponding to the name node 308 might have a full name of Trump, Donald James, which is different from Trump Donald John of node 312. Further, the Trump Donald node 310 is not certainly the same as the Trump Donald J node 308 or the Trump Donald John node 312. The address 725 $5^{th}$ Ave New York of address node 324 might be in a different state than NY, as in the address 725 $5^{th}$ Ave New York NY of node 314. However, in the context of other nodes in the graph, it would be reasonable to infer that Trump Donald J corresponding to the name node 308 and Trump Donald John corresponding to the name node 312 are very likely to be the same person, because they are very close to each other in the fourth exemplary knowledge graph 360 and their names are very similar to each other.

As described herein, a semantic neighborhood of a particular node in a particular knowledge graph is defined as a set of neighbors within a particular degree of separation of the particular node. The degree of separation corresponding to the particular node is beneficially predetermined. For example the semantic neighborhood can be within one degree of separation from the particular node, in other words any or all nodes immediately connected (i.e., directly connected) to the particular node. In another example, the semantic neighborhood can be within two degrees of separation from the particular node, in other words any or all nodes immediately connected (i.e, directly connected) to the particular node and any or all nodes immediately connected to the nodes immediately connected to the particular node. In another example, the semantic neighborhood can be within more than two degrees of separation from the particular node (e.g. "n" degrees of separation). Herein a method is described for entity resolution in a knowledge graph, in other words a method for merging together nodes that refer to the same entity. Such method is based on structural similarity and linguistic similarity. Structural similarity requires that nodes that are candidates for merging together should have similar semantic neighborhoods, or in other words, sets of their immediate neighbors should heavily overlap, or alternatively sets of their neighbors within a particular degree of separation should heavily overlap. Linguistic similarity requires that candidate nodes have similar text (e.g., similar personal names or similar physical addresses).

Figure 5:
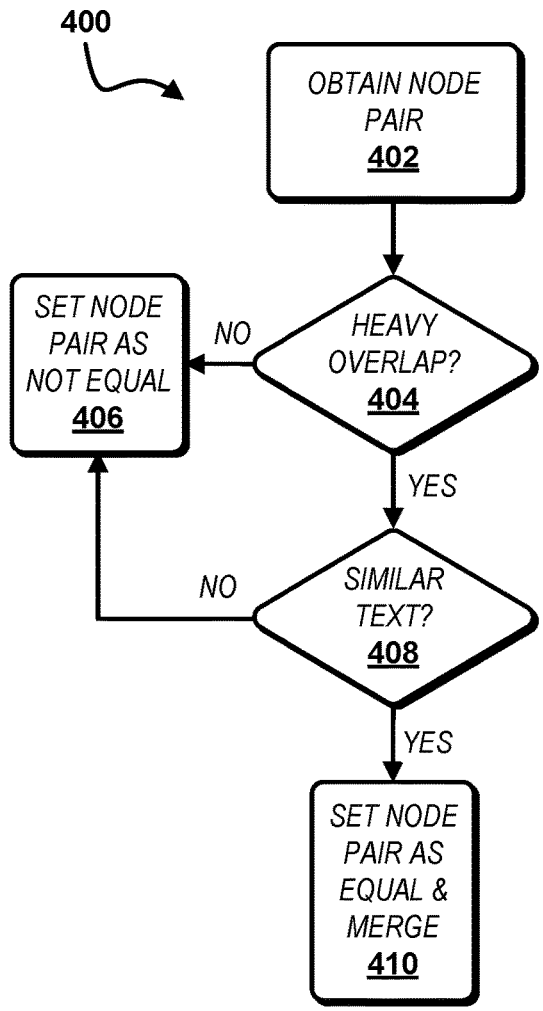

Described herein are methods for assessing structural and linguistic similarity of nodes in a large-scale knowledge graph and resolving entities in a knowledge graph based on the assessing. Referring to FIG. 5, in a first method 400, node pairs in the knowledge graph are obtained and aggregated (step 402), and for each pair of nodes in the knowledge graph it is determined whether the semantic neighborhoods of the nodes in the pair heavily overlap (step 404). For example, it is determined if the nodes in each node pair share three or more immediate neighbors, or alternatively, two or more immediate neighbors. Alternatively, it is determined if the nodes in each node pair share a threshold number of neighbors within a particular degree of separation from each node in the node pair. If it is determined that a node pair's semantic neighborhoods do not heavily overlap, it is determined that the nodes in the node pair are not equal (step 406). If it is determined that a node pair's semantic neighborhoods heavily overlap, it is then determined in step 408 whether the nodes in the node pair include similar text (e.g., similar personal names). If it is determined that the nodes in the node pair do not include similar text, the pair of nodes are determined to be not equal (step 406). If it is determined that the nodes in the node pair include similar text, the pair of nodes are determined to be equal and the nodes are merged (step 410).

The first method 400 is required to be executed over every pair of nodes in the knowledge graph to access the semantic neighborhoods of each node in a pair of nodes and attempt to overlap them. In a large-scale knowledge graph of 10 million nodes for example, there would be 50 trillion node pairs, which would make the computation of the first method 400 prohibitively slow, perhaps requiring years to execute even with a very powerful computing system.

Figure 6:
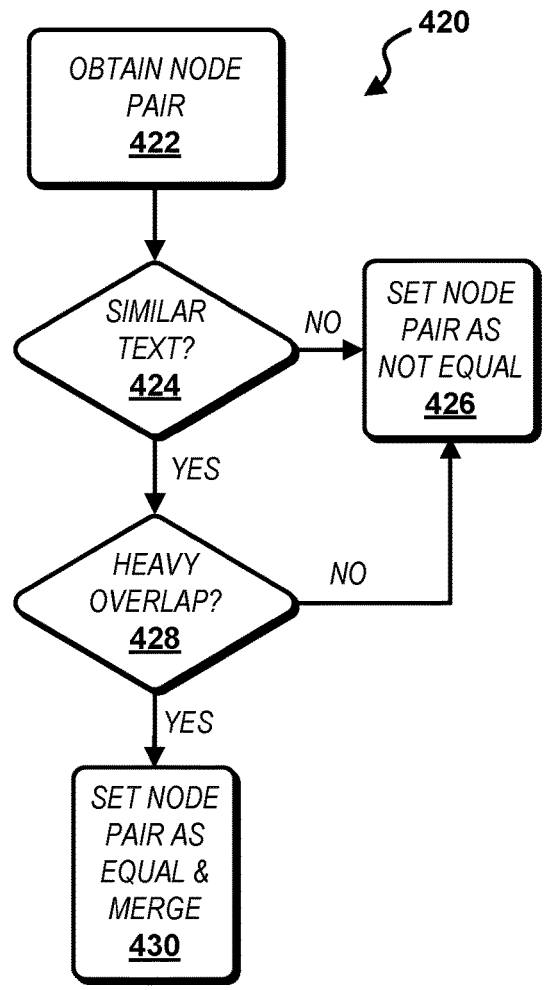

Referring to FIG. 6, in a second method 420, node pairs in a knowledge graph are obtained and aggregated (step 422), and for each pair of nodes in the knowledge graph it is determined in step 424 whether the nodes in the node pair include similar text (e.g., similar personal names or similar physical addresses). If it is determined that the nodes in the node pair do not include similar text, the pair of nodes are determined to be not equal (step 426). If it is determined that the nodes in the node pair include similar text, then it is determined whether the semantic neighborhoods of the nodes in the node pair heavily overlap (step 428). For example, it is determined if the nodes in each node pair share three or more immediate neighbors, or alternatively two or more immediate neighbors. Alternatively, it is determined if the nodes in each node pair share a threshold number of neighbors within a particular degree of separation from each node in the node pair. If it is determined that a node pair's semantic neighborhoods do not heavily overlap, it is determined that the nodes in the node pair are not equal (step 426). If it is determined that a node pair's semantic neighborhoods heavily overlap, then the pair of nodes are determined to be equal and the nodes are merged (step 430). The second method 420 is not significantly computationally faster than the first method 400, because the second method 420 like the first method 400 involves processing all pairs of nodes.

Typically, in the majority of cases, semantic neighborhoods of two nodes in a knowledge graph will not overlap, which means that not all pairs of nodes in a knowledge graph should be considered. It is beneficial to address a subset of all possible node pairs in a knowledge graph in performing a computation to determine equal node pairs and merging of node pairs. If a semantic neighborhood of a node A overlaps with a semantic neighborhood of a node B, then there is a node C that belongs to both semantic neighborhoods of node A and node B. Moreover, node A and node B belong to the semantic neighborhood of node C. In an embodiment described herein, instead of testing all node pairs (e.g., node A and node B) in the knowledge graph (e.g., a quadratic algorithm over all pairs of nodes), all pairs of nodes A and B in the semantic neighborhood of nodes C (e.g., a linear algorithm over all nodes C) are tested. Further, testing for semantic neighborhood overlaps is integrated with testing for node name similarity.

Referring to FIG. 7A, in a third method 440, in a knowledge graph, nodes which have two or more immediate neighbors are determined and aggregated (step 441). One or more node pairs are set from the two or more immediate neighbors (step 442). Alternatively, particular nodes which have two or more neighbors within a particular degree of separation from the particular node are determined, and one or more node pairs are set from such two or more neighbors. For each such node pair it is determined in step 444 whether the nodes in the node pair include similar text (e.g., similar personal names or similar physical addresses). For example for each node C, each pair of nodes A and B within node C's semantic neighborhood are tested to determine whether text of node A and the text of node B are similar, the testing beneficially performed substantially concurrently. If it is determined that the nodes in the node pair do not include similar text, the pair of nodes are determined to be not equal (step 446). If it is determined that the nodes in the node pair include similar text, then it is determined whether the semantic neighborhoods of the nodes in the pair heavily overlap by determining the immediate neighbors of each node in the pair and comparing the immediate neighbors of one of the nodes in the node pair to the immediate neighbors of the other node in the node pair (step 448). For example, for each pair of similar nodes, all tested nodes C are aggregated to determine whether the semantic neighborhoods of node A and node B overlap heavily (e.g., there are greater than a threshold number of nodes C in the overlap). For example, it is determined if the nodes in each node pair share three or more immediate neighbors, or alternatively two or more immediate neighbors. Alternatively, it is determined whether the semantic neighborhoods of the nodes in the pair heavily overlap by determining the neighbors of each node in the pair within a particular degree of separation from the respective node in the pair and comparing the neighbors of one of the nodes in the node pair to the neighbors of the other node in the node pair to determine a quantity of overlap. If it is determined that a node pair's semantic neighborhoods do not heavily overlap, it is determined that the nodes in the node pair are not equal (step 446). If it is determined that a node pair's semantic neighborhoods heavily overlap, then the pair of nodes are determined to be equal and the pair of nodes are merged (step 450). The third method 440 is significantly computationally faster than the first method 400 and the second method 420, because the third method 440, unlike the first method 400 and the second method 420, does not involve processing all pairs of nodes in a knowledge graph. The third method 440 accordingly allows improvement in the functioning of a computer.

Alternatively, even if it is determined that a node pair's semantic neighborhoods heavily overlap, if all (or alternatively one or more) of the overlapping nodes of the node pair include a threshold number of immediate neighbors, the node pair can be determined to be not equal and not merged. For example, if a particular number of node Cs are in the semantic neighborhood of both node A and node B, and each of the node Cs are connected to a large number of other nodes, this can suggest that nodes A and B do not represent the same entity, and therefore nodes A and B can be precluded from being merged. Alternatively, even if it is determined that a similar node pair's semantic neighborhoods do not heavily overlap, if just one or more overlapping nodes of the node pair do not include any immediate neighbors or include less than a threshold number of immediate neighbors, the node pair can be determined to be equivalent and can therefore be merged. For example if only one node C is in the semantic neighborhood of both node A and node B (which have been determined to be similar), and the one node C is not connected to any other nodes, this can suggest that nodes A and B represent the same entity, and nodes A and B can therefore be merged.

Referring to FIG. 7B, in a fourth method 460, in a knowledge graph, nodes which have two or more immediate neighbors are determined and aggregated (step 461). One or more node pairs are set from the two or more immediate neighbors (step 462). Alternatively, particular nodes which have two or more neighbors within a particular degree of separation from the particular node are determined, and one or more node pairs are set from such two or more neighbors. For each such node pair it is determined in step 464 whether the nodes in the pair heavily overlap by determining the immediate neighbors of each node in the pair and comparing the immediate neighbors of one of the nodes in the node pair to the immediate neighbors of the other node in the node pair. For example, all tested nodes C are aggregated to determine whether the semantic neighborhoods of node A and node B overlap heavily (e.g., there are greater than a threshold number of nodes C in the overlap). For example, it is determined if the nodes in each node pair share three or more immediate neighbors, or alternatively two or more immediate neighbors. Alternatively, it is determined whether the semantic neighborhoods of the nodes in the pair heavily overlap by determining neighbors of each node in the pair within a particular degree of separation from the respective node in the pair and comparing the neighbors of one of the nodes in the node pair to the neighbors of the other node in the node pair to determine a quantity of overlap. If it is determined that the nodes in the node pair do not heavily overlap, the pair of nodes are determined to be not equal (step 466). If it is determined that the semantic neighborhoods of the nodes in the node pair heavily overlap, then it is determined whether the nodes in the node pair include similar text (e.g., similar personal names or similar physical addresses) (step 468). For example, each heavily overlapping pair of nodes A and B within a node C's semantic neighborhood are tested to determine whether text of node A and text of node B are similar, the testing beneficially performed substantially concurrently. If it is determined that the nodes in the node pair do not include similar text, it is determined that the nodes in the node pair are not equal (step 466). If it is determined that the nodes in the node pair include similar text, then the pair of nodes are determined to be equal and the pair of nodes are merged (step 470). The fourth method 460 is significantly computationally faster than the first method 400 and the second method 420, because the fourth method 460, unlike the first method 400 and the second method 420, does not involve processing all pairs of nodes in a knowledge graph. The fourth method 460 accordingly allows improvement in the functioning of a computer.

Figure 8A:
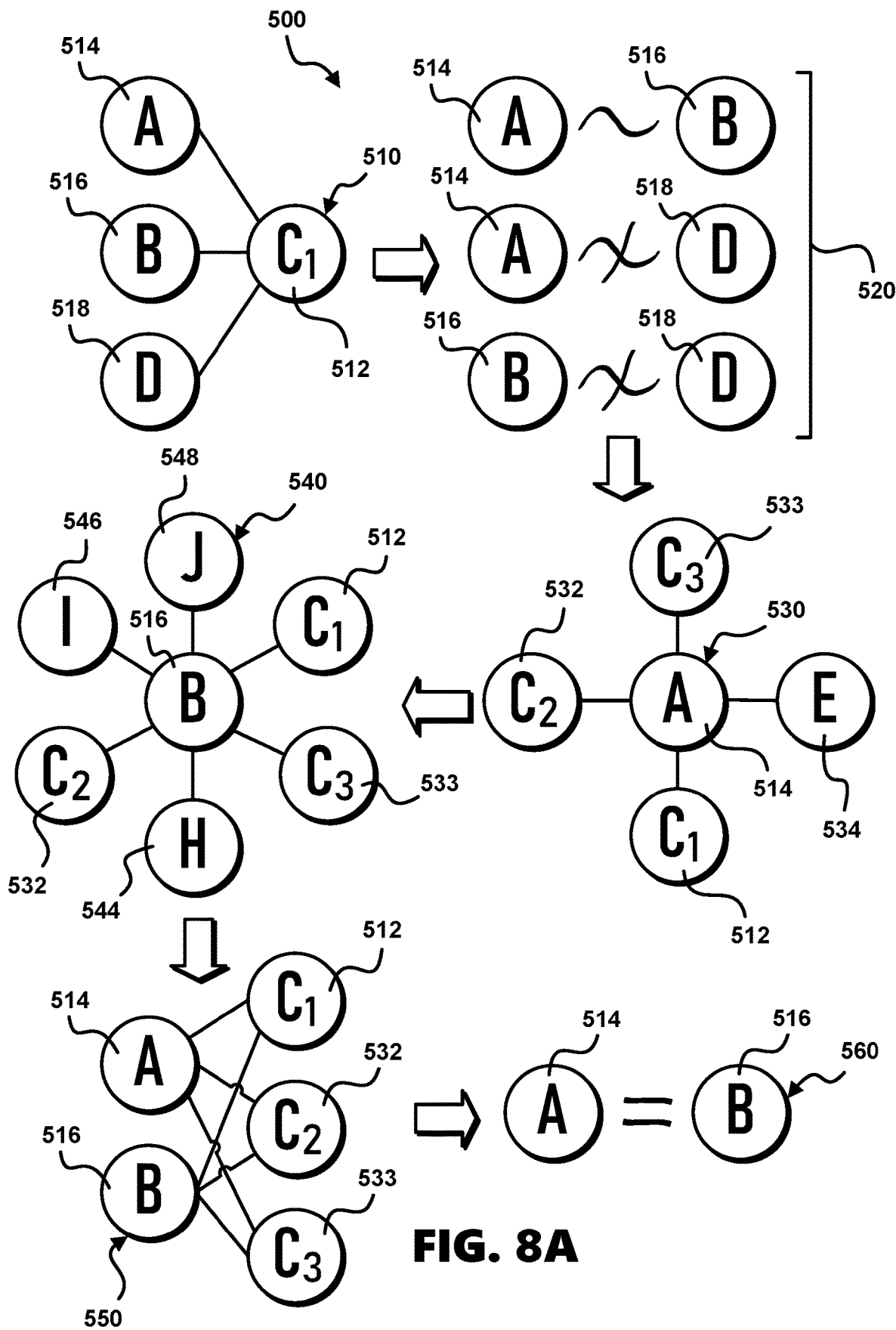
FIGS. 8A and 8B are diagrams figuratively showing an exemplary node processing data flow enabled by methods according to illustrative embodiments.
Figure 8B:
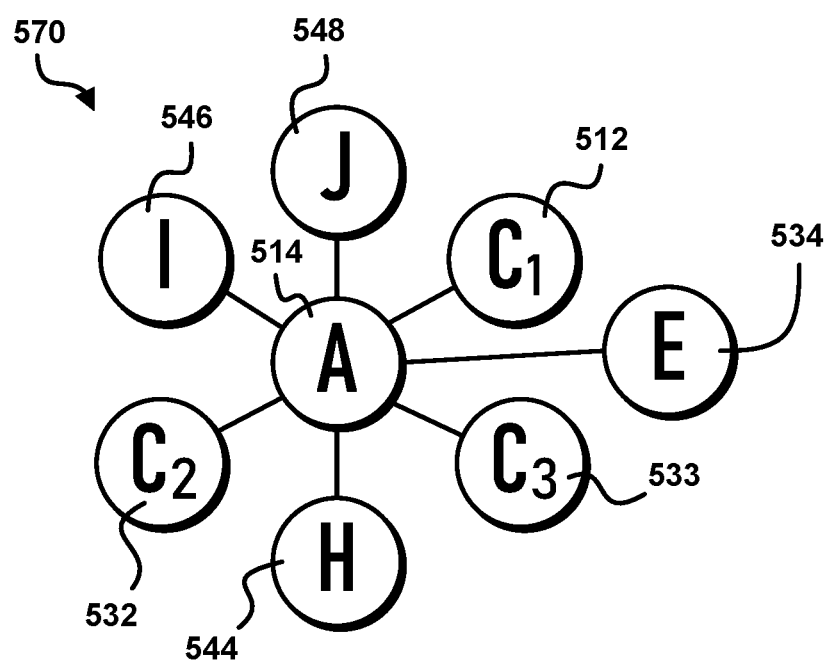

Referring to FIGS. 8A and 8B, a flow diagram 500 shows figuratively an exemplary node processing data flow enabled by the third method 440 of FIG. 7A. Per step 441, a node C 512 is determined, including immediate neighbors of node A 514, node B 516, and node D 518, which nodes form a first semantic neighborhood 510 of the node $C_1$ 512. Per step 442, a group 520 of node pairs are determined exhausting every combination of the immediate neighbors of node $C_1$ 512. Node pairs in the group 520 include node A 514 with node B 516, node A 514 with node D 518, and node B 516 with node D 518. Per step 444, it is determined based on text comparison of node data that node A 514 is similar to node B 516, node A 514 is not similar to node D 518, and node B 516 is not similar to node D 518.

Per step 448, the immediate neighbors of node A 514 are determined and the immediate neighbors of node B 516 are determined to respectively determine a second semantic neighborhood 530 of node A 514 and a third semantic neighborhood 540 of node B 516, and the immediate neighbors of the node A 514 are compared to the immediate neighbors of the node B 516 to determine the second semantic neighborhood 530 and the third semantic neighborhood 540 heavily overlap. The immediate neighbors of node A 514 include a node E 534, the node $C_1$ 512, a node $C_2$ 532, and a node $C_3$ 533. The immediate neighbors of the node B 516 include the node $C_1$ 512, the node $C_3$ 533, a node H 544, the node $C_2$ 532, a node I 546, and a node J 548. By comparing of immediate neighbors of the node A 514 and immediate neighbors of the node B 516 it is determined that the node $C_1$ 512, the node $C_2$ 532 and the node $C_3$ 533 are included in both the second semantic neighborhood 530 of the node A 514 and the third semantic neighborhood 540 of the node B 516 as shown in a combined semantic neighborhood 550. Based on a rule that two or more common immediate neighboring nodes of a node pair are designated heavily overlapping semantic neighborhoods, it is determined that the second semantic neighborhood 530 of the node A 514 and the third semantic neighborhood 540 of the node B 516 heavily overlap per step 448. Alternatively, a different threshold number of common immediate neighboring nodes (e.g., three, four, five, or more common nodes) can trigger a determination that particular semantic neighborhoods heavily overlap. Per step 450, the node A 514 and the node B 51.6 are determined to be equal and merged in expression 560 responsive to the determination that their semantic neighborhoods 530, 540 heavily overlap thereby resolving the entity corresponding to the node A 514 and the node B 516, and a merged semantic neighborhood 570 is created by the merging of node B 516 into node A 514. The third method 440 is then beneficially further applied to the merged semantic neighborhood 570 to determine if node pairs of the merged semantic neighborhood 570 of node A 514 (i.e., nodes I, J, $C_1$, E, $C_3$, H, and $C_2$) are equal and can be merged.

The third method 440 is applicable to knowledge graphs of any size. If there are semantic neighborhoods in a particular knowledge graph which are too large for expeditious computation, such large semantic neighborhoods can be ignored as they are unlikely to be helpful in the assessing structural similarities of the nodes. The third method 440 is scalable for any practical application.

Figure 9:
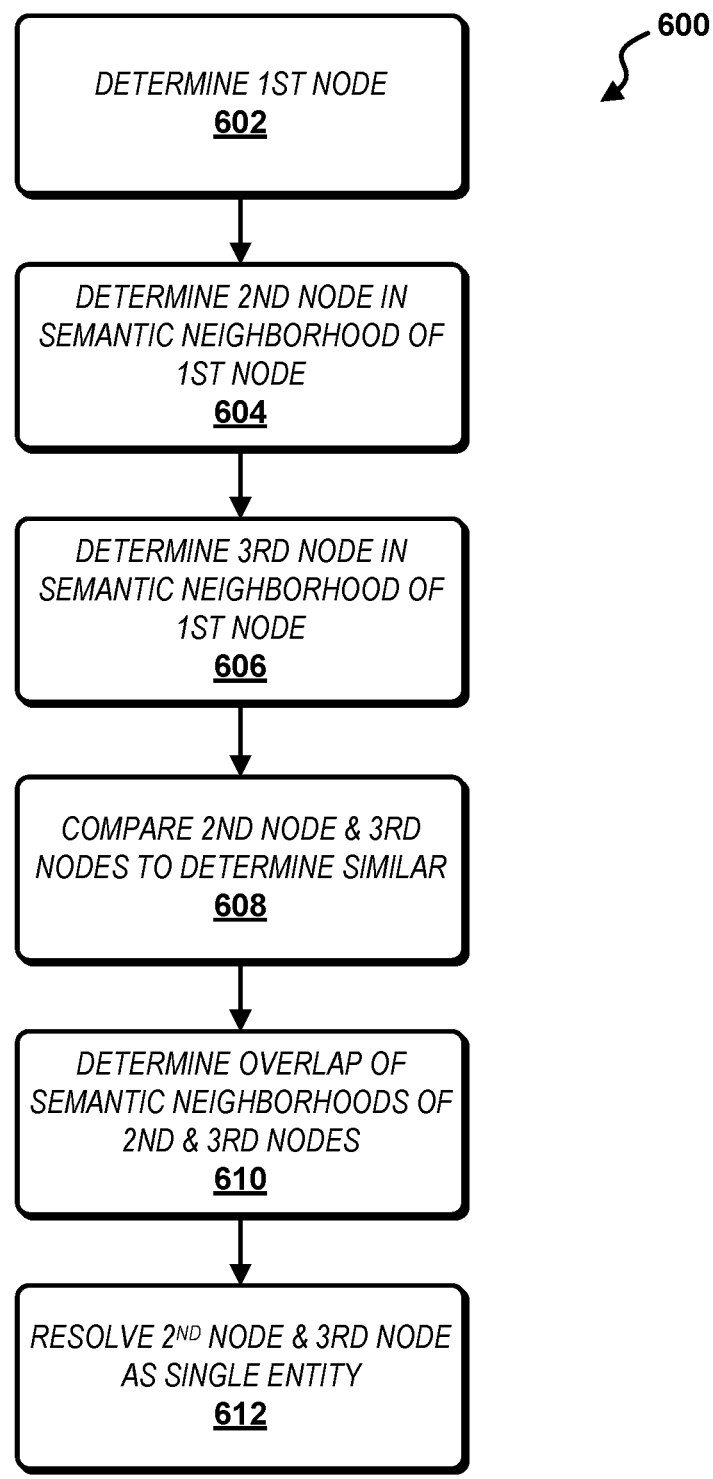
FIGS. 9 and 10 are flow diagrams showing methods for resolving entities in knowledge graphs according to illustrative embodiments.

Referring to FIG. 9, a method 600 for resolving entities in a knowledge graph is shown. The method 600 is described with reference to the components of the system 10 shown in FIG. 1, including for example the identity manager 20, the network-connectable client computer systems 40, 42, 44, and the data stores 50, 52, 54. Alternatively, the method 600 can be performed via other suitable systems and is not restricted to being implemented by the components of the system 10.

In the method 600 a plurality of node sets in a knowledge graph are determined, each of the plurality of node sets is determined by determining a first node (step 602), determining a second node in a semantic neighborhood of the first node (step 604), and determining a third node in the semantic neighborhood of the first node (step 606). For each of the plurality of node sets, the second node and the third node are compared, and it is determined that the second node and the third node are a similar node pair based on the comparing (step 608). For each similar node pair, the first nodes of the plurality of node sets are aggregated into an overlap of a semantic neighborhood of the second node and a semantic neighborhood of the third node, and a quantity of overlapping of the semantic neighborhood of the second node and the semantic neighborhood of the third node is determined based on the aggregating the first nodes of the plurality of node sets (step 610). Beneficially, the aggregating the first nodes of the plurality of node sets and the determining the quantity of overlapping of the semantic neighborhood of the second node and the semantic neighborhood of the third node are responsive to determining that the second node and the third node are similar. For each similar node pair, the second node and the third node are resolved as a single entity at least based on the determining the quantity of overlapping of the semantic neighborhood of the second node and of the semantic neighborhood of the third node and the determining that the second node and the third node are the similar node pair (step 612). Once a node pair is resolved as a single entity, the single entity can be used in further determining steps under the method 600 to further resolve the knowledge graph.

Beneficially, for a similar node pair of a particular node set of the plurality of node sets, the determining the quantity of overlapping comprises determining one or more particular nodes in the semantic neighborhood of the second node and the third node of the particular node set (e.g., immediately connected to both the second node and the third node), the one or more particular nodes including at least the first node of the particular node set. Alternatively, other suitable threshold number of nodes can be determined in the semantic neighborhood of the second node and the third node (e.g., two, more, three, or four or more particular nodes), for example immediately connected to the second node and the third node. Resolving the second node and the third node as a single entity can be triggered by the determining of the threshold number of nodes in the semantic neighborhood of (e.g., immediately connected to) both the second node and the third node. For example, for a similar node pair of a first node set of the plurality of node sets, the determining the quantity of overlapping can include determining three or more particular nodes in the semantic neighborhood of the second node and the third node of the first node set, the three or more particular nodes can include the first node of the first node set of the plurality of node sets, the first node of a second node set of the plurality of node sets, and the first node of a third node set of the plurality of node sets.

The method 600 can further include determining a quantity of nodes in the semantic neighborhood of the first node of a particular node set, and resolving the second node and the third node as the single entity further based on the quantity of nodes in the semantic neighborhood of the first node of the particular node set. More particularly, the method can further include determining a quantity of nodes in the semantic neighborhood of the first node of the particular node set is less than a particular threshold, and resolving the second node and the third node as the single entity further based on the determining the quantity of nodes in the semantic neighborhood of the first node of the particular node set being less than the particular threshold.

In an example implementation of the method 600, for a similar node pair of a first node set of the plurality of node sets, the determining the quantity of overlapping can include determining two or more particular nodes in the semantic neighborhood of the second node of the first node set and in the semantic neighborhood of the third node of the first node set. The two or more particular nodes include the first node of the first node set of the plurality of node sets and the first node of a second node set of the plurality of node sets. The method can further include for the similar node pair of the first node set of the plurality of node sets determining a quantity of nodes in the semantic neighborhood of the first node of the first node set and determining a quantity of nodes in the semantic neighborhood of the first node of the second node set, and resolving the second node and the third node as the single entity further based on the quantity of nodes in the semantic neighborhood of the first node of the first node set and the quantity of nodes in the semantic neighborhood of the second node set.

In a further example implementation of the method 600, for each of the plurality of node sets, the semantic neighborhood of the first node can be immediate neighbors of the first node (i.e., within one degree of separation from the first node), the semantic neighborhood of the second node can be immediate neighbors of the second node (i.e., within one degree of separation from the second node), and the semantic neighborhood of the third node can be immediate neighbors of the third node (i.e., within one degree of separation from the third node). Alternatively, for each of the plurality of node sets the semantic neighborhood of the first node can be immediate neighbors of the first node and immediate neighbors of the immediate neighbors of the first node (i.e., within two degrees of separation from the first node), the semantic neighborhood of the second node can be immediate neighbors of the second node and immediate neighbors of the immediate neighbors of the second node (i.e., within two degrees of separation from the second node), and the semantic neighborhood of the third node can be immediate neighbors of the third node and immediate neighbors of the immediate neighbors of the third node (i.e., within two degrees of separation from the third node). More generally, for each of the plurality of node sets, the semantic neighborhood of the first node can be neighbors within a particular degree of separation from the first node, the semantic neighborhood of the second node can be neighbors within a particular degree of separation from the second node, and the semantic neighborhood of the third node can be neighbors within a particular degree of separation from the third node.

For each of the plurality of node sets, the particular degree of separation from the first node can be equal to the particular degree of separation from the second node and to the particular degree of separation from the third node. Alternatively, for each of the plurality of node sets, the particular degree of separation from the first node can be not equal to the particular degree of separation from the second node and the particular degree of separation from the third node. Alternatively, for each of the plurality of node sets the particular degree of separation from the second node can be not equal to the particular degree of separation from the first node and the particular degree of separation from the third node. More generally, each or any of the particular degree of separation from the first node, the particular degree of separation from the second node, and the particular degree of separation from the third node can be unique, or alternatively, can be the same as one or more others of the particular degree of separation from the first node, the particular degree of separation from the second node, and the particular degree of separation from the third node.

For each of the plurality of node sets, the second node can include a personal name (e.g., "Donald J. Trump") and the third node can include a personal name (e.g., "Trump Donald"), and comparing the second node and the third node can include comparing the personal name of the second node and the personal name of the third node. The personal name of the second node (e.g., "Donald J. Trump") and the personal name of the third node (e.g., "Trump Donald J") can be determined to share one or more name elements (e.g., "Donald") to determine that the second node and the third node are a similar node pair. Alternatively, the personal name of the second node (e.g., "Donald J. Trump") and the personal name of the third node (e.g., "Trump Donald J") can be determined to share at least two name elements (e.g., "Donald" and "Trump") to determine that the second node and the third node are a similar node pair. Alternatively, the personal name of the second node (e.g., "Donald J. Trump") and the personal name of the third node (e.g., "Trump Donald J") can be determined to share one or more name elements (e.g., "Donald") and one or more initials of a second name element (e.g., "J") to determine that the second node and the third node are a similar node pair.

For each of the plurality of node sets, the first node can include one or more of a physical address, a company name, or a property identifier. Alternatively, for each of the plurality of node sets, the first node can include a personal name. Further, in a particular embodiment, for each of the plurality of node sets the second node can include one or more of a physical address, a company name, or a property identifier, and the third node can include another physical address, another company name, or another property identifier, and comparing the second node and the third node can include comparing the physical address, company name, or property identifier of the second node and the physical address, company name, or property identifier of the third node. For example, it can be determined that the physical address, company name, or property identifier of the second node and the physical address, company name, or property identifier of the third node share one or both of a name element or a number element to determine that the second node and the third node are a similar node pair.

The method 600 can be performed for example by the identity manager 20 which can be enabled by a computing system including one or more hardware processors and one or more non-transitory computer-readable storage media coupled to the one or more hardware processors and storing programming instructions for execution by the one or more hardware processors, wherein the programming instructions, when executed, cause the computing system to perform the method 600. The identity manager 20 is configured to receive data from a plurality of network-accessible data sources for example one or more of the internal data store 50, the private data store 52, or the public data store 54 via the ingestion engine 22. The knowledge graph is generated based on the received data for example via the heuristics engine 24. For each similar node pair, the knowledge graph is updated, for example via the augmentation engine 26, based on the resolving as the single entity of the second node and the third node of each similar node pair to merge the similar node pair. A request via a network for the knowledge graph can be received by the identity manager 20, for example from the network-connectable client computer systems 40, 42, 44. The updated knowledge graph can be rendered accessible via the network responsive to the request, for example rendered accessible to the network-connectable client computer systems 40, 42, 44.

Figure 10:
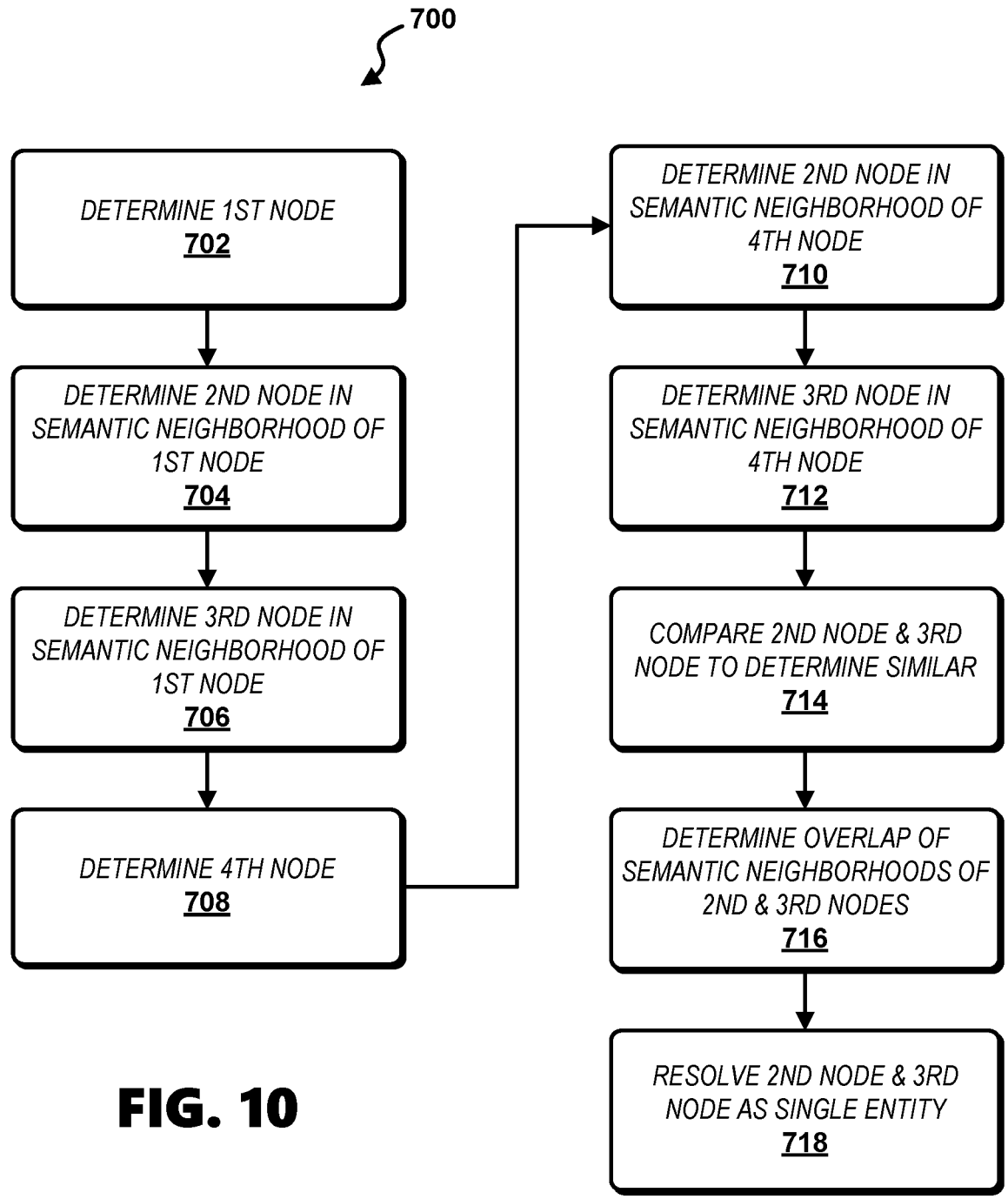

Referring to FIG. 10, a detailed example of the method 600 is provided in the form of the method 700. In the method 700, a first node set in the knowledge graph is determined. The determining the first node set includes determining a first node (step 702), determining a second node in a semantic neighborhood of the first node (step 704), and determining a third node in the semantic neighborhood of the first node (step 706). A second node set is determined in the knowledge graph, the determining the second node set includes determining a fourth node (step 708), determining the second node is further in a semantic neighborhood of the fourth node (step 710), and determining the third node is further in the semantic neighborhood of the fourth node (step 712). The second node and the third node are compared and it is determined that the second node and the third node are similar based on the comparing the second node and the third node (step 714). At least the first node set and the second node set are aggregated and a quantity of overlapping of a semantic neighborhood of the second node and a semantic neighborhood of the third node is determined based on the aggregating the at least the first node set and the second node set (step 716). The second node and the third node are resolved as a single entity at least based on the determining the quantity of overlapping of the semantic neighborhood of the second node and the semantic neighborhood of the third node and the determining that the second node and the third node are similar (step 718).

The method 700 can be extended to allow for a greater quantity of overlapping of the semantic neighborhood of the second node and the semantic neighborhood of the third node to trigger resolving the second and third node as a single entity. For example, a third node set in the knowledge graph can be determined, the determining the third node set including determining a fifth node, determining the second node is further in a semantic neighborhood of the fifth node, and determining the third node is further in the semantic neighborhood of the fifth node. At least the first node set, the second node set, and the third node set can be aggregated, and the quantity of overlapping of the semantic neighborhood of the second node and the semantic neighborhood of the third node can be determined based on the aggregating the at least the first node set, the second node set, and the third node set. In an extension to the preceding example, a fourth node set in the knowledge graph can be determined, the determining the fourth node set including determining a sixth node, determining the second node is further in a semantic neighborhood of the sixth node, and determining the third node is further in the semantic neighborhood of the sixth node. At least the first node set, the second node set, the third node set, and the fourth node set can be aggregated, and the quantity of overlapping of the semantic neighborhood of the second node and the semantic neighborhood of the third node can be determined based on the aggregating the at least the first node set, the second node set, the third node set, and the fourth node set. The aggregating of the node sets and determining the quantity of overlapping are beneficially responsive to determining the second node and the third node are similar. Alternatively, the determining that the second node and the third node are similar can be based on the determining the quantity of overlapping. For example, it can be determined that the quantity of overlapping exceeds a threshold, wherein the determining that the second node and the third node are similar is responsive to determining the quantity of overlapping exceeds the threshold.

Figure 11:
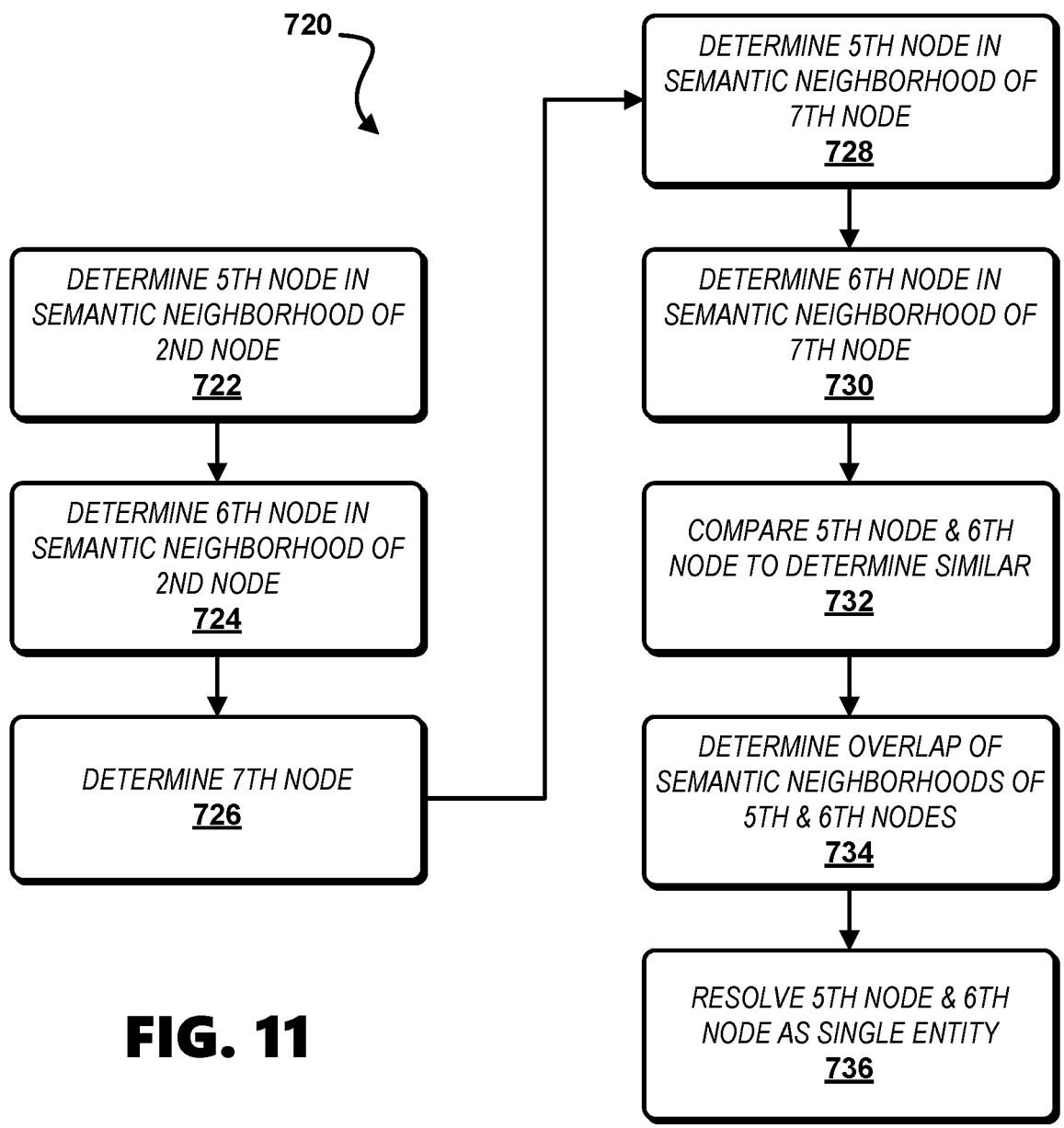
FIG. 11 is a flow diagram showing a continuation of the method of FIG. 10.

Once a node pair is resolved as a single entity, the single entity can be used in further determining steps under the method 700 to further resolve the knowledge graph. Referring to FIG. 11, a method 720 provided as a continuation of the method 700 for further resolving entities in a knowledge graph is shown. The method 720 continues from step 718 at step 722. In the case of method 720, the resolving of the second and third nodes of step 718 includes resolving the second and third nodes as a single entity including the second node. A third node set is determined in the knowledge graph, the determining the third node set including determining a fifth node in the semantic neighborhood of the second node (step 722) and determining a sixth node in the semantic neighborhood of the second node (step 724). A fourth node set is determined in the knowledge graph, the determining the fourth node set including determining a seventh node (step 726), determining the fifth node is further in a semantic neighborhood of the seventh node (step 728), and determining the sixth node is further in the semantic neighborhood of the seventh node (step 730). The fifth node and the sixth node are compared, and it is determined that the fifth node and the sixth node are similar based on the comparing the fifth node and the sixth node (step 732). At least the third node set and the fourth node set are aggregated, and a quantity of overlapping of a semantic neighborhood of the fifth node and a semantic neighborhood of the sixth node is determined based on the aggregating the at least the third node set and the fourth node set (step 734). The fifth node and the sixth node are resolved as another single entity at least based on the determining the quantity of overlapping of the semantic neighborhood of the fifth node and the semantic neighborhood of the sixth node and the determining that the fifth node and the sixth node are similar (step 736). In an exemplary extension to the method 700, a fifth node set can be determined in the knowledge graph, the determining the fifth node set including determining an eighth node, determining the fifth node is further in a semantic neighborhood of the eighth node, and determining the sixth node is further in the semantic neighborhood of the eighth node. In such case at least the third node set, the fourth node set, and the fifth node set can be aggregated, and the quantity of overlapping of the semantic neighborhood of the fifth node and the semantic neighborhood of the sixth node can be determined based on the aggregating the at least the third node set, the fourth node set, and the fifth node set. Further, additional node sets can be determined and the quantity of overlapping of the semantic neighborhood of the fifth node and the semantic neighborhood of the sixth node can be determined further based on the aggregating the additional node sets.

In an exemplary implementation of the methods 700 and 720, the second node can for example include a personal name, the third node can include another personal name, and comparing the second node and third node can include comparing the personal name of the second node and the personal name of the third node. Further in the exemplary implementation, the first node determined in step 702 can for example include a first physical address and the fourth node determined in step 708 can include a second physical address.

In a further exemplary implementation of the method 700, the semantic neighborhood of the first node can be immediate neighbors of the first node, the semantic neighborhood of the second node can be immediate neighbors of the second node, the semantic neighborhood of the third node can be immediate neighbors of the third node, and the semantic neighborhood of the fourth node can be immediate neighbors of the fourth node. More generally, the semantic neighborhood of the first node can be neighbors within a particular degree of separation from the first node, the semantic neighborhood of the second node can be neighbors within a particular degree of separation from the second node, the semantic neighborhood of the third node can be neighbors within a particular degree of separation from the third node, and the semantic neighborhood of the fourth node can be neighbors within a particular degree of separation from the fourth node. The particular degree of separation from the first node can be equal to the particular degree of separation from the second node and to the particular degree of separation from the third node and to the particular degree of separation from the fourth node. Alternatively, the particular degree of separation from the first node can be not equal to the particular degree of separation from the second node and the particular degree of separation from the third node and to the particular degree of separation from the fourth node. Alternatively, the particular degree of separation from the second node can be not equal to the particular degree of separation from the first node and the particular degree of separation from the third node and the particular degree of separation from the fourth node. More generally, each or any of the particular degree of separation from the first node, the particular degree of separation from the second node, the particular degree of separation from the third node, and the particular degree of separation from the fourth node can be unique, or alternatively, can be the same as one or more others of the particular degree of separation from the first node, the particular degree of separation from the second node, the particular degree of separation from the third node, and the particular degree of separation from the fourth node.

Figure 12:
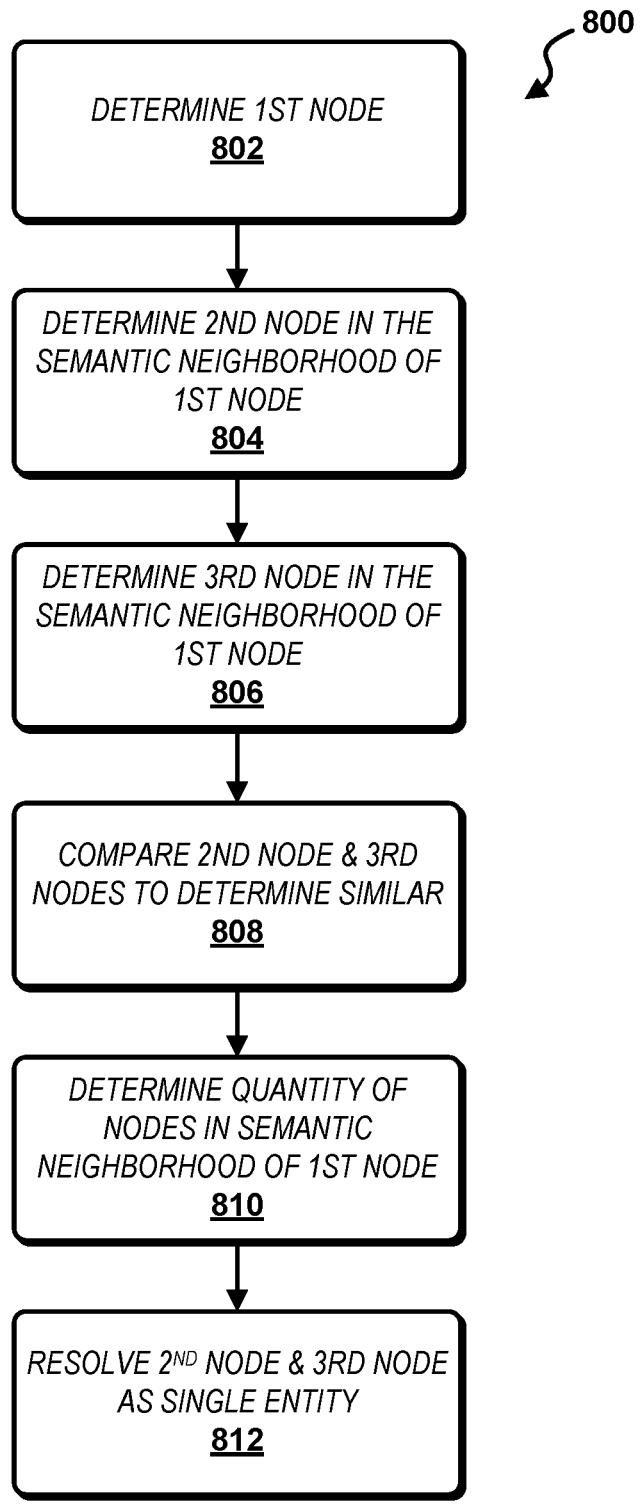
FIG. 12 is a flow diagram showing another method for resolving entities in a knowledge graph according to an illustrative embodiment.

Referring to FIG. 12 a diagram is shown of a method 800 for resolving a knowledge graph. The method includes determining a first node (step 802), determining a second node in a semantic neighborhood of the first node (step 804), and determining a third node in the semantic neighborhood of the first node (step 806). The second node and the third node are compared, and it is determined that the second node and the third node are similar based on the comparing the second node and the third node (step 808). A quantity of nodes in the semantic neighborhood of the first node is determined (step 810), and the second node and the third node are resolved as a single entity at least based on the determining the quantity of nodes in the semantic neighborhood of the first node and the determining that the second node and the third node are similar (step 812). In an extension of the method 800, the first node and a plurality of other nodes in the knowledge graph can be aggregated into an overlap of a semantic neighborhood of the second node and a semantic neighborhood of the third node, a quantity of overlapping of the semantic neighborhood of the second node and the semantic neighborhood of the third node can be determined based on the aggregating the first node and the plurality of other nodes, and the second node and the third node can be resolved as the single entity further based on the determining the quantity of overlapping of the semantic neighborhood of the second node and the semantic neighborhood of the third node.

In an example implementation of the method 800, the semantic neighborhood of the first node can be immediate neighbors of the first node, the semantic neighborhood of the second node can be immediate neighbors of the second node, and the semantic neighborhood of the third node can be immediate neighbors of the third node. Alternatively, the semantic neighborhood of the first node can be immediate neighbors of the first node and immediate neighbors of the immediate neighbors of the first node, the semantic neighborhood of the second node can be immediate neighbors of the second node and the immediate neighbors of the immediate neighbors of the second node, and the semantic neighborhood of the third node can be immediate neighbors of the third node and the immediate neighbors of the immediate neighbors of the third node. More generally, for each of the plurality of node sets, the semantic neighborhood of the first node can be neighbors within a particular degree of separation from the first node, the semantic neighborhood of the second node can be neighbors within a particular degree of separation from the second node, and the semantic neighborhood of the third node can be neighbors within a particular degree of separation from the third node. Each or any of the particular degree of separation from the first node, the particular degree of separation from the second node, and the particular degree of separation from the third node can be unique, or alternatively, can be the same as one or more others of the particular degree of separation from the first node, the particular degree of separation from the second node, and the particular degree of separation from the third node.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for resolving entities in a knowledge graph to compress the knowledge graph to facilitate a network-based transaction, the method comprising:
   determining a plurality of node sets in the knowledge graph, determining each of the plurality of node sets comprising:
   determining a first node;
   determining a second node in a semantic neighborhood of the first node; and
   determining a third node in the semantic neighborhood of the first node;

for each of the plurality of node sets, responsive to the determining the second node in the semantic neighborhood of the first node and the determining the third node in the semantic neighborhood of the first node, comparing the second node and the third node, and determining that the second node and the third node are a similar node pair based on the comparing the second node and the third node;

for each similar node pair, responsive to the determining the second node and the third node are similar, aggregating the first nodes of the plurality of node sets into an overlap of a semantic neighborhood of the second node and a semantic neighborhood of the third node, and determining a quantity of overlapping of the semantic neighborhood of the second node and the semantic neighborhood of the third node based on the aggregating the first nodes of the plurality of node sets; and for each similar node pair, resolving the second node and the third node as a single entity at least based on the determining the quantity of overlapping of the semantic neighborhood of the second node and the semantic neighborhood of the third node and the determining that the second node and the third node are the similar node pair.

2. The method of claim 1, wherein for a similar node pair of a particular node set of the plurality of node sets, the determining the quantity of overlapping comprises determining at least one particular node in the semantic neighborhood of the second node and the semantic neighborhood of the third node of the particular node set, the at least one particular node comprising the first node of the particular node set.

3. The method of claim 2, further comprising for the similar node pair of the particular node set of the plurality of node sets:
  determining a quantity of nodes in the semantic neighborhood of the first node of the particular node set; and
  resolving the second node and the third node as the single entity further based on the quantity of nodes in the semantic neighborhood of the first node of the particular node set.

4. The method of claim 2, further comprising for the similar node pair of the particular node set of the plurality of node sets:
  determining a quantity of nodes in the semantic neighborhood of the first node of the particular node set is less than a particular threshold; and
  resolving the second node and the third node as the single entity further based on the determining the quantity of nodes in the semantic neighborhood of the first node of the particular node set being less than the particular threshold.

5. The method of claim 1, for a similar node pair of a first node set of the plurality of node sets, the determining the quantity of overlapping comprises determining at least two particular nodes in the semantic neighborhood of the second node of the first node set and in the semantic neighborhood of the third node of the first node set.

6. The method of claim 5, the at least two particular nodes comprising the first node of the first node set of the plurality of node sets and the first node of a second node set of the plurality of node sets, the method further comprising for the similar node pair of the first node set of the plurality of node sets:
  determining a quantity of nodes in the semantic neighborhood of the first node of the first node set;
  determining a quantity of nodes in the semantic neighborhood of the first node of the second node set; and
  resolving the second node and the third node as the single entity further based on the quantity of nodes in the semantic neighborhood of the first node of the first node set and the quantity of nodes in the semantic neighborhood of the first node of the second node set.

7. The method of claim 5, the method further comprising for the similar node pair of the first node set of the plurality of node sets:
  determining a quantity of nodes in the semantic neighborhood of at least one of the at least two particular nodes; and
  resolving the second node and the third node as the single entity further based on the quantity of nodes in the semantic neighborhood of the at least one of the at least two particular nodes.

8. The method of claim 1, for a similar node pair of a first node set of the plurality of node sets, the determining the quantity of overlapping comprising determining at least three particular nodes in the semantic neighborhood of the second node and the third node of the first node set.

9. The method of claim 8, the at least three particular nodes comprising the first node of the first node set of the plurality of node sets, the first node of a second node set of the plurality of node sets, and the first node of a third node set of the plurality of node sets.

10. The method of claim 1, wherein for each of the plurality of node sets:
  the second node comprises a personal name of the second node;
  the third node comprises a personal name of the third node; and
  comparing the second node and the third node comprises comparing the personal name of the second node and the personal name of the third node.

11. The method of claim 10, further comprising for each of the plurality of node sets determining the personal name of the second node and the personal name of the third node share at least one name element to determine that the second node and the third node are the similar node pair.

12. The method of claim 10, further comprising for each of the plurality of node sets determining the personal name of the second node and the personal name of the third node share at least two name elements to determine that the second node and the third node are the similar node pair.

13. The method of claim 10, further comprising for each of the plurality of node sets determining the personal name of the second node and the personal name of the third node share at least a first name element and an initial of a second name element to determine that the second node and the third node are the similar node pair.

14. The method of claim 10, wherein for each of the plurality of node sets the first node comprises a physical address.

15. The method of claim 10, wherein for each of the plurality of node sets the first node comprises at least one of a physical address, a company name, or a property identifier.

16. The method of claim 1, wherein for each of the plurality of node sets:
  the second node comprises a physical address of the second node;
  the third node comprises a physical address of the third node; and
  comparing the second node and the third node comprises comparing the physical address of the second node and the physical address of the third node.

17. The method of claim 16, further comprising determining the physical address of the second node and the physical address of the third node share a name element and a number element to determine that the second node and the third node are the similar node pair.

18. The method of claim 16, wherein for each of the plurality of node sets the first node comprises a personal name.

19. The method of claim 1, wherein for each of the plurality of node sets:
the second node comprises a company name of the second node;
the third node comprises a company name of the third node; and
comparing the second node and the third node comprises comparing the company name of the second node and the company name of the third node.

20. The method of claim 19, further comprising determining the company name of the second node and the company name of the third node share at least one name element to determine that the second node and the third node are the similar node pair.

21. The method of claim 1, further comprising:
receiving data from a plurality of network-accessible data sources;
generating the knowledge graph based on the data;
for each similar node pair, updating the knowledge graph based on the resolving as the single entity the second node and the third node of each similar node pair;
receiving a request via a network for the knowledge graph; and
rendering the updated knowledge graph accessible via the network responsive to the request.

22. The method of claim 1, wherein for each similar node pair the aggregating the first nodes of the plurality of node sets and the determining the quantity of overlapping of the semantic neighborhood of the second node and the semantic neighborhood of the third node are responsive to determining that the second node and the third node are similar.

23. The method of claim 1, wherein for each of the plurality of node sets:
the semantic neighborhood of the first node are immediate neighbors of the first node;
the semantic neighborhood of the second node are immediate neighbors of the second node; and
the semantic neighborhood of the third node are immediate neighbors of the third node.

24. The method of claim 1, wherein for each of the plurality of node sets:
the semantic neighborhood of the first node are immediate neighbors of the first node and immediate neighbors of the immediate neighbors of the first node;
the semantic neighborhood of the second node are immediate neighbors of the second node and immediate neighbors of the immediate neighbors of the second node; and
the semantic neighborhood of the third node are immediate neighbors of the third node and the immediate neighbors of the immediate neighbors of the third node.

25. The method of claim 1, wherein for each of the plurality of node sets:
the semantic neighborhood of the first node are neighbors within a particular degree of separation from the first node;
the semantic neighborhood of the second node are neighbors within a particular degree of separation from the second node; and
the semantic neighborhood of the third node are neighbors within a particular degree of separation from the third node.

26. The method of claim 25, wherein for each of the plurality of node sets the particular degree of separation from the first node is equal to the particular degree of separation from the second node and to the particular degree of separation from the third node.

27. The method of claim 25, wherein for each of the plurality of node sets the particular degree of separation from the first node is not equal to the particular degree of separation from the second node and the particular degree of separation from the third node.

28. The method of claim 25, wherein for each of the plurality of node sets the particular degree of separation from the second node is not equal to the particular degree of separation from the first node and the particular degree of separation from the third node.

29. A method for resolving entities in a knowledge graph to compress the knowledge graph to facilitate a network-based transaction, the method comprising:
determining a first node;
determining a second node in a semantic neighborhood of the first node; and
determining a third node in the semantic neighborhood of the first node;
comparing the second node and the third node responsive to the determining the second node in the semantic neighborhood of the first node and the determining the third node in the semantic neighborhood of the first node, and determining that the second node and the third node are similar based on the comparing the second node and the third node;
aggregating the first node and a plurality of other nodes in the knowledge graph into an overlap of a semantic neighborhood of the second node and a semantic neighborhood of the third node responsive to the determining the second node and the third node are similar, and determining a quantity of overlapping of the semantic neighborhood of the second node and the semantic neighborhood of the third node based on the aggregating the first node and the plurality of other nodes; and
resolving the second node and the third node as a single entity at least based on the determining the quantity of overlapping of the semantic neighborhood of the second node and the semantic neighborhood of the third node and the determining that the second node and the third node are similar.

30. The method of claim 29, wherein the aggregating the first node and the plurality of other nodes in the knowledge graph and the determining the quantity of overlapping of the semantic neighborhood of the second node and the semantic neighborhood of the third node are responsive to determining that the second node and the third node are similar.

31. The method of claim 29, wherein the determining that the second node and the third node are similar is based on the determining the quantity of overlapping.

32. The method of claim 31, further comprising determining the quantity of overlapping exceeds a threshold, wherein the determining that the second node and the third node are similar is responsive to determining the quantity of overlapping exceeds the threshold.

33. The method of claim 29, wherein:
the semantic neighborhood of the first node are immediate neighbors of the first node;
the semantic neighborhood of the second node are immediate neighbors of the second node; and the semantic neighborhood of the third node are immediate neighbors of the third node.

34. The method of claim 29, wherein:

the semantic neighborhood of the first node are neighbors within a particular degree of separation from the first node;

the semantic neighborhood of the second node are neighbors within a particular degree of separation from the second node; and the semantic neighborhood of the third node are neighbors within a particular degree of separation from the third node.

\* \* \* \* \*